(12) United States Patent
Jones

(10) Patent No.: US 6,327,246 B1
(45) Date of Patent: Dec. 4, 2001

(54) CONTROLLED AVAILABLE BIT RATE SERVICE IN AN ATM SWITCH

(75) Inventor: Trevor Jones, Maldon (GB)

(73) Assignee: Ahead Communications Systems, Inc., Middlebury, CT (US)

( * ) Notice: Subject to any disclaimer, the term of this patent is extended or adjusted under 35 U.S.C. 154(b) by 0 days.

(21) Appl. No.: 09/077,219

(22) PCT Filed: Nov. 27, 1996

(86) PCT No.: PCT/US96/19720

§ 371 Date: May 19, 1998

§ 102(e) Date: May 19, 1998

(87) PCT Pub. No.: WO97/20415

PCT Pub. Date: Jun. 5, 1997

(30) Foreign Application Priority Data

Nov. 29, 1995 (GB) .................................................. 9524396

(51) Int. Cl.[7] .............................. H04L 12/56; H04J 3/16
(52) U.S. Cl. .................................... 370/232; 370/412
(58) Field of Search .................................. 370/230, 232, 370/233, 234, 235, 412, 415, 462, 468; 709/232, 234, 235

(56) References Cited

U.S. PATENT DOCUMENTS

| | | | |
|---|---|---|---|
| 5,150,358 | 9/1992 | Punj et al. | 370/418 |
| 5,231,633 | 7/1993 | Hluchyi et al. | 370/429 |
| 5,280,475 | 1/1994 | Yanagi et al. | 370/399 |
| 5,339,332 | 8/1994 | Kammerl | 375/225 |
| 5,381,407 | 1/1995 | Chao | 370/233 |
| 5,400,329 | * 3/1995 | Tokura et al. | 370/232 |
| 5,448,567 | 9/1995 | Dighe et al. | 370/233 |
| 5,497,375 | * 3/1996 | Hluchyi et al. | 370/232 |
| 5,499,238 | 3/1996 | Shon | 370/399 |
| 5,504,744 | 4/1996 | Adams et al. | 370/232 |
| 5,559,798 | 9/1996 | Clarkson et al. | 370/468 |
| 5,561,791 | 10/1996 | Mendelson et al. | 709/233 |

FOREIGN PATENT DOCUMENTS

| | | |
|---|---|---|
| 95301520.3 | 8/1995 | (EP) . |
| 9504231-3 | 11/1995 | (SE) . |

* cited by examiner

*Primary Examiner*—Min Jung
(74) *Attorney, Agent, or Firm*—David P. Gordon; David S. Jacobson; Thomas A. Gallagher

(57) ABSTRACT

An ATM switch (10) has a plurality of link controllers (12) each having a FIFO (30) for each VC established, a FIFO (32) for each priority level, and a traffic shaping FIFO (34) for pointers to ABR cells. Cells are pushed into the VC FIFO (30) and a pointer to the VC FIFO (30) is pushed into an arbitration FIFO (32) for the priority level of the VC FIFO (30). Pointers to ABR cells with onward transmission times are pushed into the traffic shaping FIFO (34). The arbitration FIFOs (32) are examined according to a schedule and cells are popped from VC FIFOs (30) according to priority for exit from the controller (12). A leaky bucket processor (22) calculates an average output cell rate OCR and ABR cells are popped from VC FIFOs out of turn if the MCR for the ABR VC exceed the OCR.

25 Claims, 7 Drawing Sheets

CONTROLLED AVAILABLE BIT RATE SERVICE IN AN ATM SWITCH

This application is related to co-owned International Application Number PCT/US96/05606 and co-owned International Application Number PCT/US96/15737, the complete disclosures of which are hereby incorporated by reference herein.

BACKGROUND OF THE INVENTION

1. Field of the Invention

The invention relates to an asynchronous transfer mode (ATM) network switch. More particularly, the invention relates to an ATM switch having cell buffers for each available bit rate (ABR) virtual connection (VC) and means for outputting cells which conforms to a minimum cell rate (MCR) for each ABR VC and which fairly allocates bandwidth to all VCs on the switch.

2. State of the Art

In ATM data transmission, cells of data conventionally comprising fifty-three bytes (forty-eight bytes carrying data and the remaining five bytes defining the cell header, the address and related information) pass through the network on a virtual connection at an agreed upon rate related to the available bandwidth and the level or service paid for. The agreed upon rate will relate not only to the steady overage flow of data, but will also limit the peak flow rates.

Over an extensive network, cells on a virtual connection can become bunched together with different cells having different delays imposed upon them at different stages, so that the cell flow on a VC then does not conform with the agreed upon rates. To prevent rates being exceeded to the detriment of other VCs in the network, the network will include, for example at the boundary between different networks, means for policing the flow. The flow policing means typically includes a "leaky bucket" device which assesses the peak and average flow rates of cells on a VC and if required either downgrades the cells' priority or discards cells.

Since policing can result in the discarding of cells which should not be discarded, it is desirable to effect "traffic shaping" to space out the cells on a VC sufficiently so as to ensure that they meet the agreed upon rates, and in particular the peak rates. A problem with traffic shaping is that it is desirable to delay the transmission of cells by variable amounts in an attempt to avoid cell loss. In practice, however, variable cell delay has been difficult to implement.

Co-owned International Application Number PCT/US96/05606 discloses an ATM switch with a traffic shaping mechanism which delays the transmission of incoming cells by varying amounts of time and which accounts for both peak and average cell flow rates. The traffic shaping mechanism broadly comprises means for determining for each cell received an onward transmission time dependent upon the time interval between the arrival of the cell and the time of arrival of the preceding cell on the same VC, buffer means for storing each new cell at an address corresponding to the onward transmission time, and means for outputting cells from the buffer means at a time corresponding to the address thereof. The traffic shaping mechanism results in cells being output at a rate which is related to the rate at which they are received which eliminates or minimizes bunching.

Different virtual connections may have different priority levels. Presently, the ATM standard provides for several different priority levels. These include "constant bit rate" (CBR) service, which is the highest priority level, two "variable bit rate" (VBR) services, and available bit rate (ABR) service, which is the lowest priority level. As traffic passes through an ATM switch, it is important to handle the cells according to their level of priority.

Co-owned International Application Number PCT/US96/15737 discloses an ATM switch which includes a plurality of slot controllers each having at least one external network link and a link to a switch fabric, the slot controllers receiving ATM cells from the network and transmitting cells to other slot controllers via the switch fabric and receiving cells from the switch fabric and transmitting cells onto the network. Each slot controller is provided with a plurality of FIFO buffers, one cell FIFO for each VC established on the switch and one arbitration FIFO for each priority level, and a FIFO controller. When a cell enters a slot controller, the cell header is examined to determine the VCI and the priority level. The slot controller examines the switch fabric to find a path for the VC, selects a VC FIFO for the VC, pushes the cell into the VC FIFO, increments a counter for the VC FIFO, and, if the VC FIFO was previously empty, writes a pointer to the arbitration FIFO for the priority level of the cell FIFO. The arbitration FIFOs are examined according to a schedule and cells are popped from VC FIFOs according to priority for exit from the slot controller. According to one disclosed embodiment, the highest priority arbitration FIFO is always examined first and none of the lower priority arbitration FIFOs are examined unless the highest priority arbitration FIFO is empty. According to another embodiment, timers are set for the lower priority arbitration FIFOs and if a timer expires for a lower priority arbitration FIFO, it is examined regardless of the contents of the highest priority arbitration FIFO. According to still another embodiment, the slot controllers are coupled to two switch fabrics and two sets of arbitration FIFOs are used, one set for each switch fabric. Prior to popping a cell from a FIFO into the switch fabric, the switch fabric is examined to determine if the path is broken and whether an alternate path exists through the second switch fabric. If an alternate path is available, the cell is not sent, but the pointer for the VC FIFO is pushed into the corresponding arbitration FIFO for the second switch fabric. The system described provides efficient handling of all priority levels, but is not specifically mindful of the needs of ABR traffic.

ABR service is intended to make the best use of any remaining available bandwidth in an ATM switch after providing for the higher priority services. ABR service is suitable for data transmission which is not time sensitive, but which may be cell loss sensitive. ABR service is generally implemented by buffering data at the ingress of an ATM switch and releasing the data from the buffer into the switch core only when some available bandwidth is not being used by a higher priority connection. Clearly, in order for this approach to function correctly without an unacceptable level of cell loss, the source of the data must transmit data at a rate ("cell rate") which does not cause the buffer to overflow.

According to presently utilized techniques, ABR service is managed through the use of special ATM cells which are known as Rm cells. Rm cells are sent from the source through the destination and return to the source with information about the congestion level in the ATM switches which form the ABR VC between the source and the destination. The source is then able to modify its transmission cell rate to avoid cell loss due to congestion. As presently implemented, Rm cells include fields for indicating the current cell rate (CCR), the minimum cell rate (MCR), and the explicit rate (ER). The CCR is the rate at which the source is presently transmitting ATM cells. The MCR is a rate which is established at the time the VC is set up and indicates the minimum rate at which the source may always transmit cells without cell loss. The ER is the new rate to which the source should adjust cell transmission due to the level of congestion in the switches which form the ABR VC. The ER is set by the switches which form the ABR VC and may be a rate which is higher than or lower than the CCR. However, the ER may not be set lower than the MCR. Various algorithms are utilized in ATM switches to set the ER for an ABR VC.

Several difficulties have been encountered with the implementation of ABR service. Many of the algorithms used to determine the ER are not equipped to deal with the situation when the calculated ER is less than the MCR. For example, most algorithms assume that all ABR VCs through the switch have the same MCR and that the ER for any ABR VC will be applied to all ABR VCs through the switch. In reality, different ABR VCs have different MCRs. If the calculated ER is lower than some of the actual MCRs of the ABR VCs through the switch, these ABR VCs will not be reduced to the calculated ER even though the algorithm assumes that they will. Thus, the algorithm will assume that congestion has been accounted for when, in reality some of the ABR VCs will continue to operate at a CCR which is too high for the congestion on the VCs.

SUMMARY OF THE INVENTION

It is therefore an object of the invention to provide an ATM switch with means for controlling the flow of ABR cells through the switch.

It is also an object of the invention to provide an ATM switch with means for controlling the flow of ABR cells through the switch which guarantees the MCR bandwidth for all ABR VCs.

It is another object of the invention to provide an ATM switch with means for controlling the flow of ABR cells through the switch which provides an accurate and fair ER for each ABR VC.

In accord with these objects which will be discussed in detail below, an ATM switch according to the invention includes a plurality of slot controllers each having at least one external network link and a link to a switch fabric, the slot controllers receiving ATM cells from the network and transmitting cells to other slot controllers via the switch fabric and receiving cells from the switch fabric and transmitting cells onto the network. Each slot controller is provided with an input cell processor, an output cell processor, and a plurality of FIFO buffers, one cell FIFO for each VC established on the switch, one arbitration FIFO for each priority level, and a traffic shaping FIFO. The traffic shaping FIFO is preferably configured as a leaky bucket and is provided with a look-up table for storing the MCRs of the ABR VCs.

According to the methods of the invention, when a cell enters a slot controller, the cell header is examined to determine the VCI and the priority level. The slot controller examines the switch fabric to find a path for the VC, selects a VC FIFO for the VC, pushes the cell into the VC FIFO, increments a counter for the VC FIFO, and, if the VC FIFO was previously empty, writes a pointer to the arbitration FIFO for the priority level of the cell FIFO. The arbitration FIFOs are examined according to a schedule and cells are popped from VC FIFOs according to priority for exit from the slot controller as described in co-owned International Application Number PCT/US96/15737.

According to the invention, an onward transmission time for each ABR cell is calculated according to the methods described in co-owned International Application Number PCT/US96/05606 and address pointers to ABR cells are stored in the traffic shaping FIFO as well as in an arbitration FIFO. The input cell processor monitors the peak cell flow rate for each ABR VC on the switch according to a leaky bucket process and determines for each cell whether the peak cell flow rate has been exceeded. If the peak rate has been exceeded, such that the leaky bucket overflows, the amount of overflow is added to the current time as the address for the cell in the VC FIFO so that the onward transmission of the cell is delayed by the amount of the overflow. The ABR cells are thus output from the VC FIFOs in the order of time slots stored in the traffic shaping FIFO. In order to assure that the MCR is maintained for each ABR VC, the cell processor monitors the output bandwidth of all ABR traffic and calculates an average over a predetermined period of time. The output bandwidth per ABR VC, the output cell rate (OCR) is determined by dividing the average output bandwidth of all ABR traffic by the number of pointers in the traffic shaping FIFO. When a pointer is popped from the traffic shaping FIFO, the current value of the OCR is determined and the MCR for the ABR VC is looked up. If the OCR is greater than the MCR, the pointer from the traffic shaping FIFO is discarded and the cell is output according to the arbitration FIFO scheduling, i.e. the cell is temporarily left in the VC FIFO. If the OCR is less than the MCR, the pointer from the traffic shaping FIFO is used immediately to output a cell from the appropriate VC FIFO. When pointers from arbitration FIFOs are used, the OCR is also compared to the MCR. If the OCR is greater than the MCR, the pointer is used to output the cell and the pointer is pushed back to the bottom of the arbitration FIFO. If the OCR is less than the MCR, the cell is left in the VC FIFO.

In addition, according to the invention, an ER value is set at or just below the OCR and is signalled back to the source for each ABR VC. The ER for individual ABR VCs may be fine tuned according to the factor $$\left(1 - \frac{VCcount}{MAXcount}\right)$$

where VCcount is the number of cells in a particular VC FIFO and MAXcount is a configurable parameter for each particular ABR VC.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
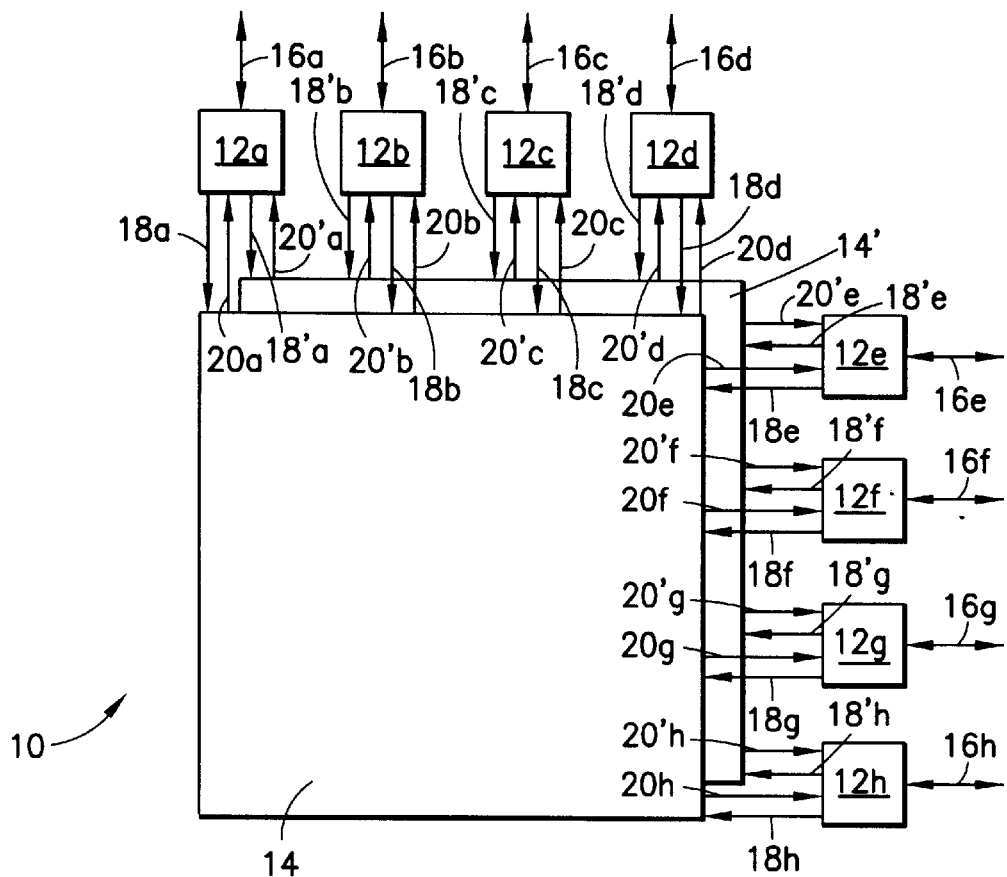
FIG. 1 is a high level schematic diagram of an ATM switch according to the invention.

Referring now to FIG. 1, an ATM switch 10 according to the invention includes a plurality of controllers (which are often called "slot controllers" or "link controllers") 12a–12g and two dynamic crosspoint switch fabrics 14, 14'. Each slot controller has at least one external link 16a–16h to an ATM network (not shown), an input link 18a–18h to the switch fabric 14, an output link 20a–20h from the switch fabric 14, an input link 18'a–18'h to the switch fabric 14', and an output link 20'a–20'h from the switch fabric 14'. This general arrangement is described in co-owned UK Patent Application No. 9507454.8 and UK Patent Application No. 9505358.3 which are hereby incorporated by reference herein in their entireties.

Figure 2:
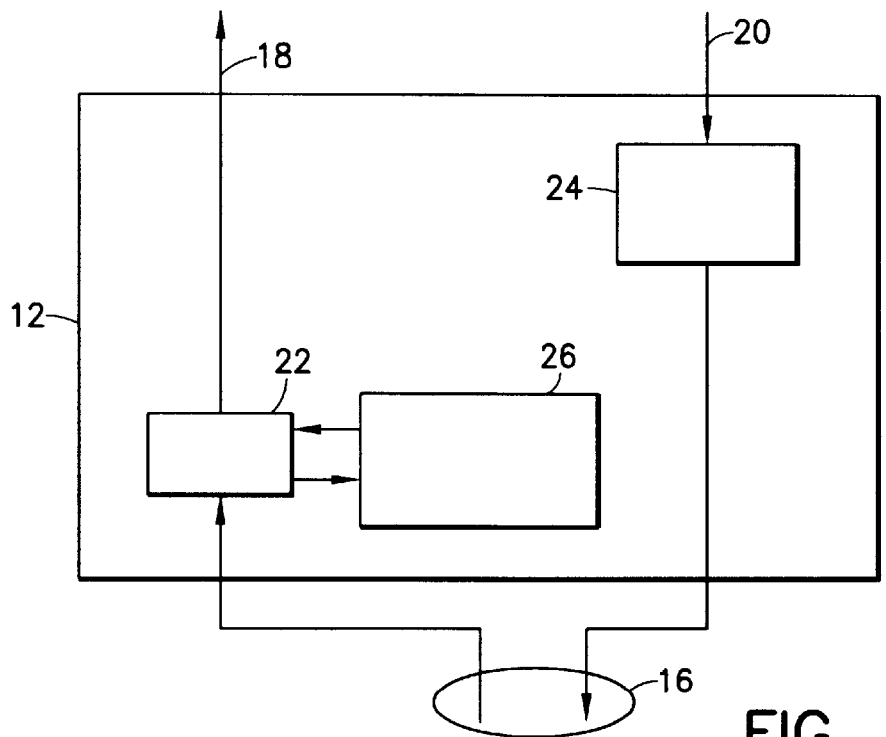
FIG. 2 is a high level schematic diagram of a slot controller according to a first embodiment of the invention.

As shown generally in FIG. 2, each slot controller 12 has an input cell processor 22, an output cell processor 24, and a cell buffering system 26. According to a presently preferred embodiment of the invention, the cell buffering system 26 is coupled to the input cell processor 22 for buffering cells received from the ATM network before they pass through the switch 10. In this embodiment of the invention, the output cell processor 24 is conventional and handles such functions as writing cell headers with new VPI/VCI information before passing cells onto the network. The input cell processor 22 is unconventional in that it controls the buffering system 26 in addition to other conventional functions such as reading cell headers and routing cells through the switch fabric to another slot controller.

Figure 3:
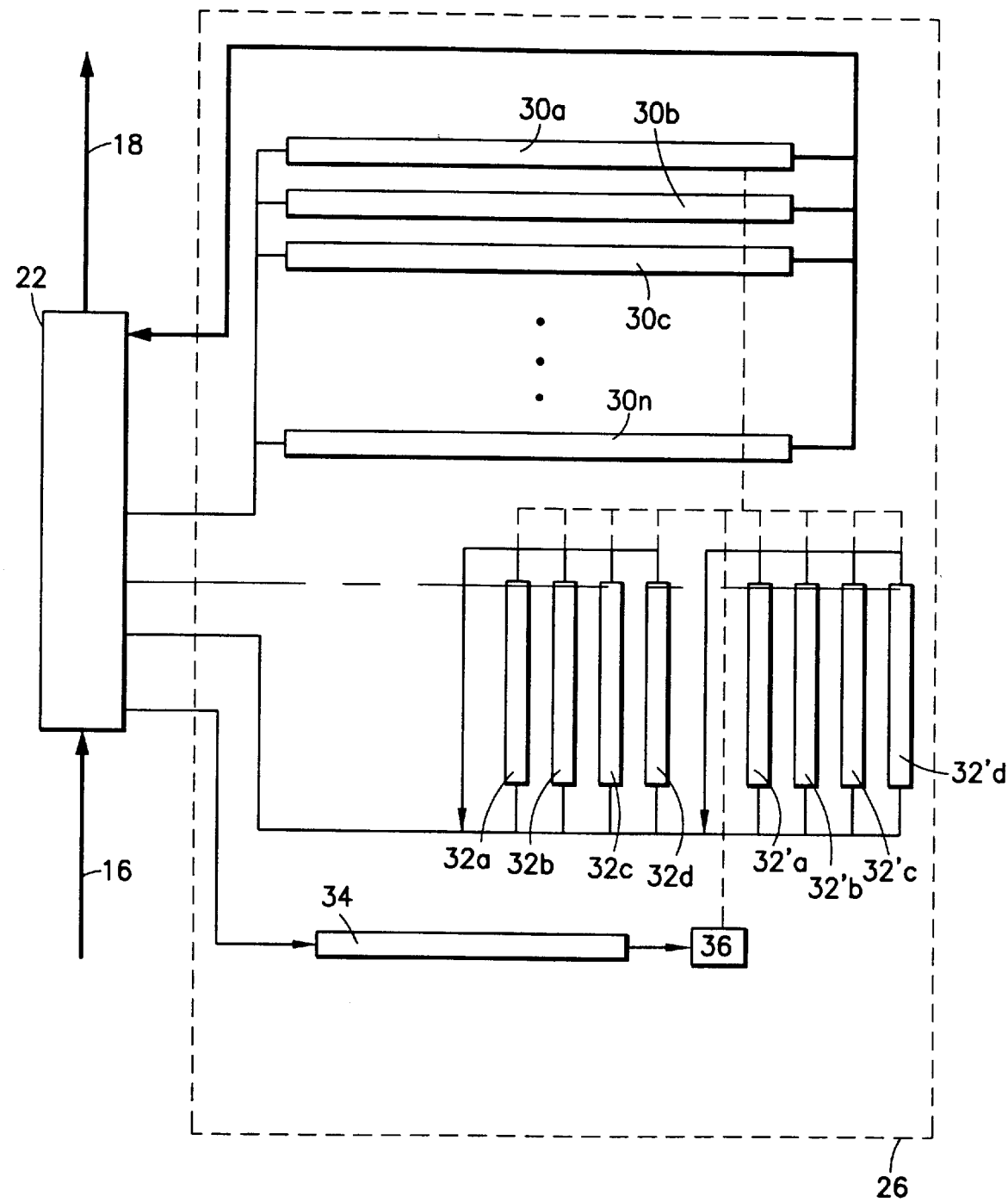
FIG. 3 is a high level schematic diagram of a cell buffering system according to one embodiment of the invention.

Turning now to FIG. 3, the buffering system 26 generally includes a plurality of VC FIFOs 30a, 30b, 30c, . . . , 30n, a plurality of priority level arbitration FIFOs 32a–32d, 32'a–32'd, a traffic shaping FIFO 34, and an MCR look-up table 36. The FIFOs are coupled to the input cell processor and controlled by the input cell processor as described below with reference to FIGS. 4 and 5. According to the presently preferred embodiment of the invention, the VC FIFOs are not individual hardware components but are rather dynamically configured in RAM as needed. The number of FIFOs created depends on the number of VCs being handled by the particular slot controller. According to the invention, when a cell is inspected by the cell processor 22 to determine the VCI of the cell, a FIFO is created for that VC (if one does not already exist). Typically, each VC FIFO would be a 64K FIFO, although FIFOs of different sizes could be used depending on the number of cells expected for a particular VC. The arbitration FIFOs are preferably also dynamically configured in RAM. The number of arbitration FIFOs corresponds to the number of priority levels for VCs through the switch. As shown in FIG. 3, there are four arbitration FIFOs representing the current ATM priority levels of "0" through "3" ("0" being the highest priority and "3" being ABR). In the presently preferred embodiment, a separate set of arbitration FIFOs is used for each switch fabric. Thus, as shown in FIG. 3, FIFOs 32a–32d would be used for switch fabric 14 (FIG. 1) and FIFOs 32'a–32'd would be used for switch fabric 14'. The traffic shaping FIFO 34 and the MCR look-up table 36 are also preferably dynamically configured in RAM. The size of the traffic shaping FIFO and the MCR look-up table is related to the number of ABR VCs being handled by a particular slot controller and the MCR for each ABR VC.

Figure 4:
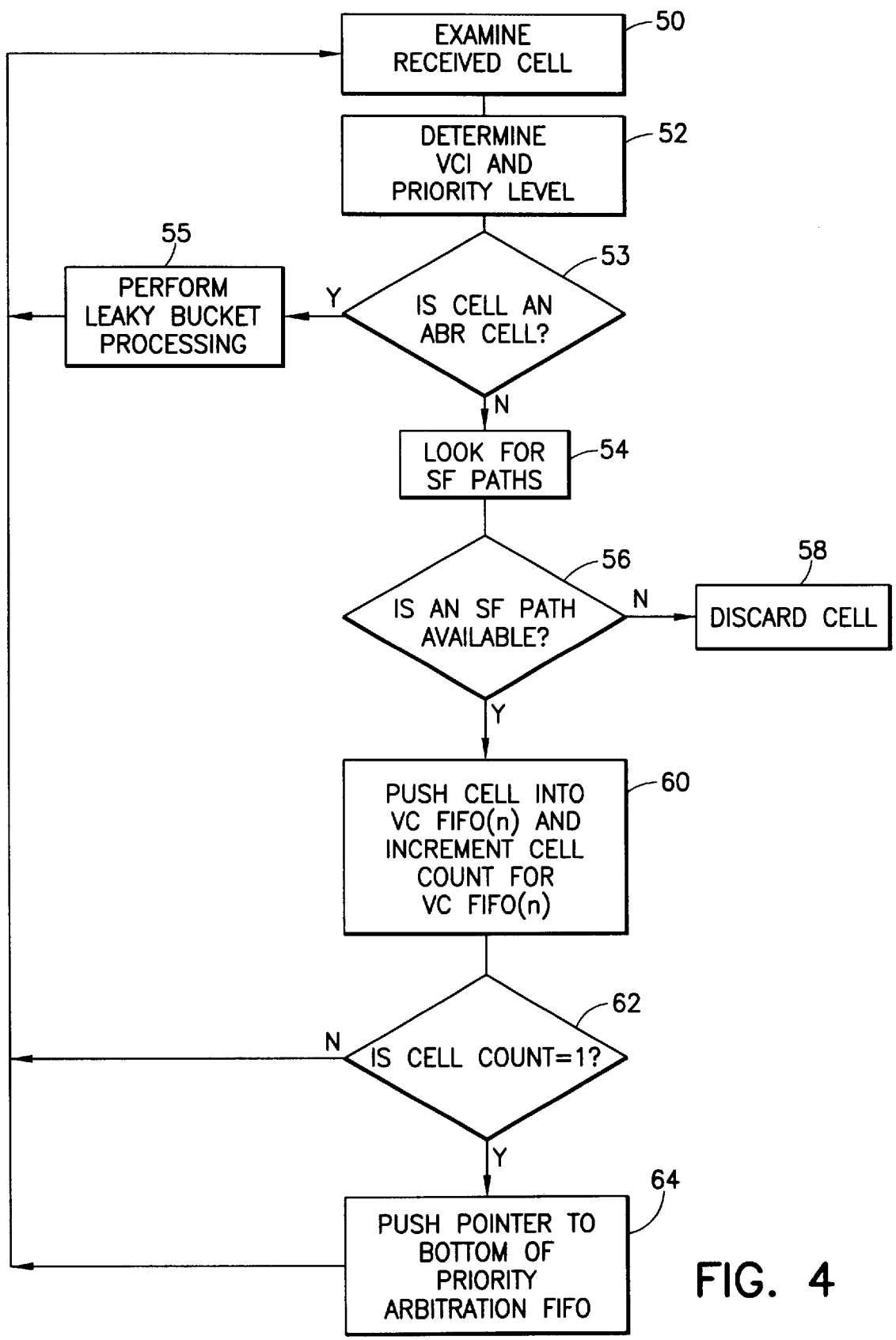
FIG. 4 is a schematic flow chart of how all cells entering the buffering system are handled.
Figure 5:
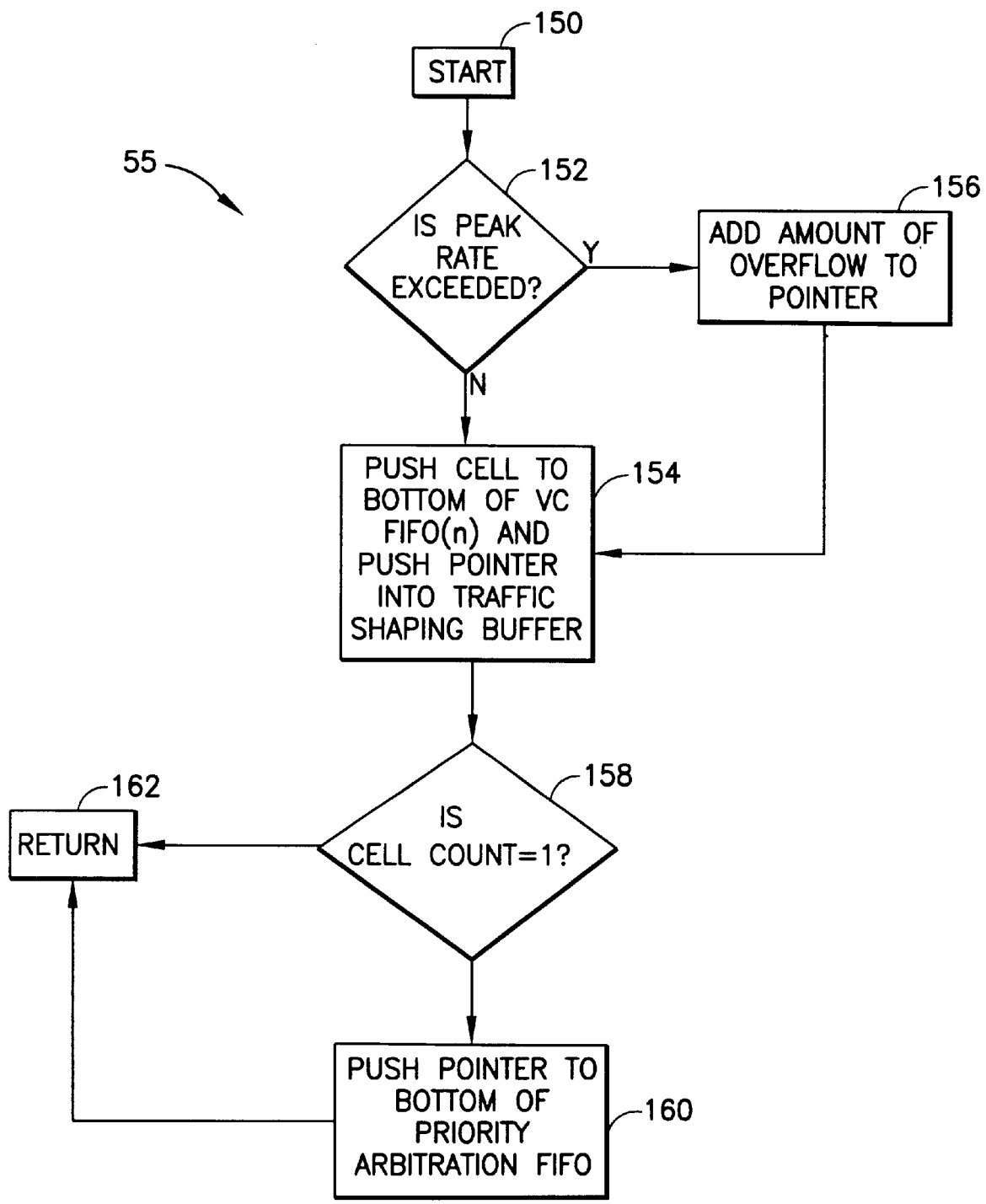
FIG. 5 is a schematic flow chart of how ABR cells entering the buffering system are handled.
Figure 6A:
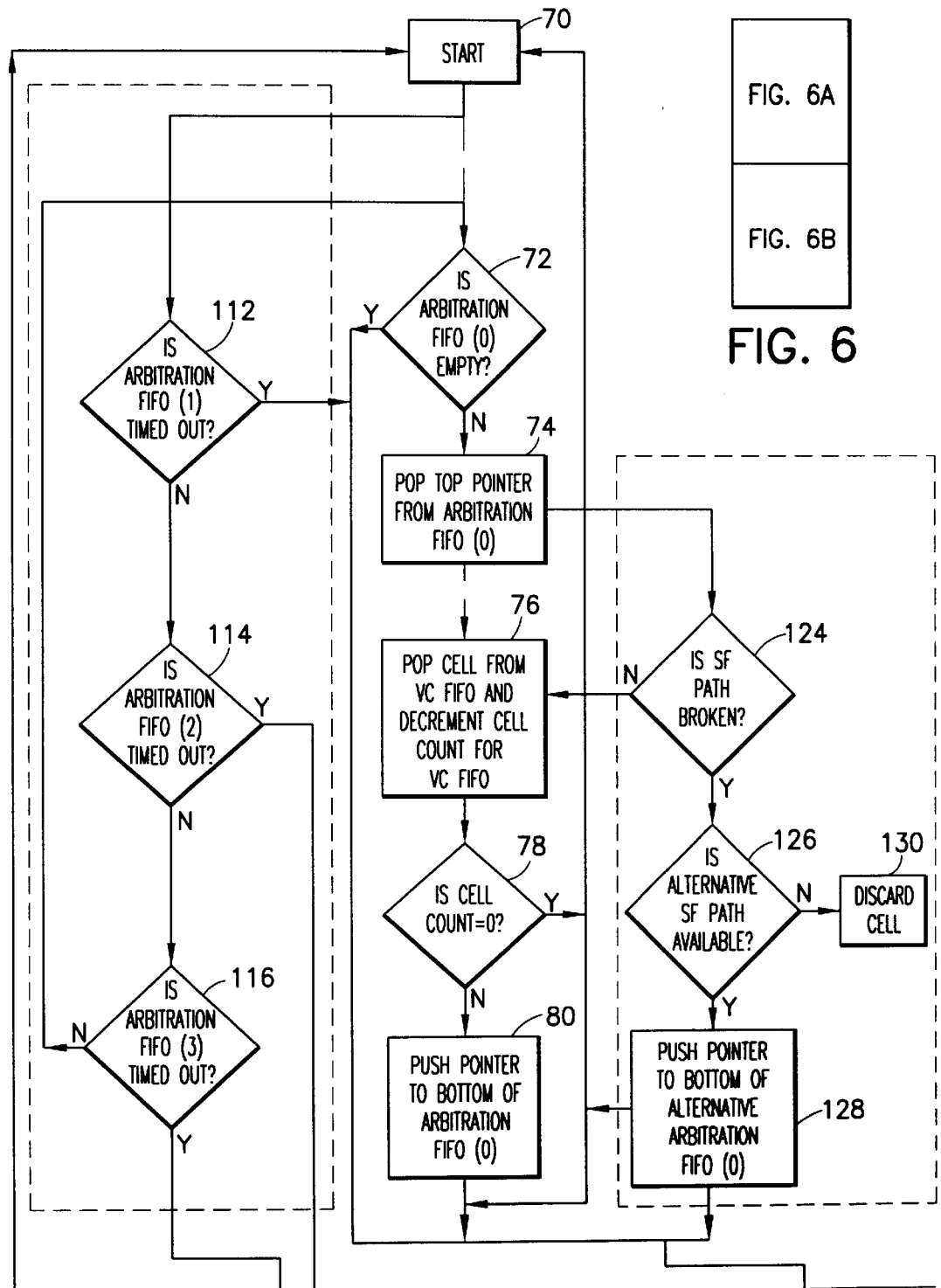
FIG. 6 is a schematic flow chart of how all cells exiting the buffering system are handled.
Figure 6B:
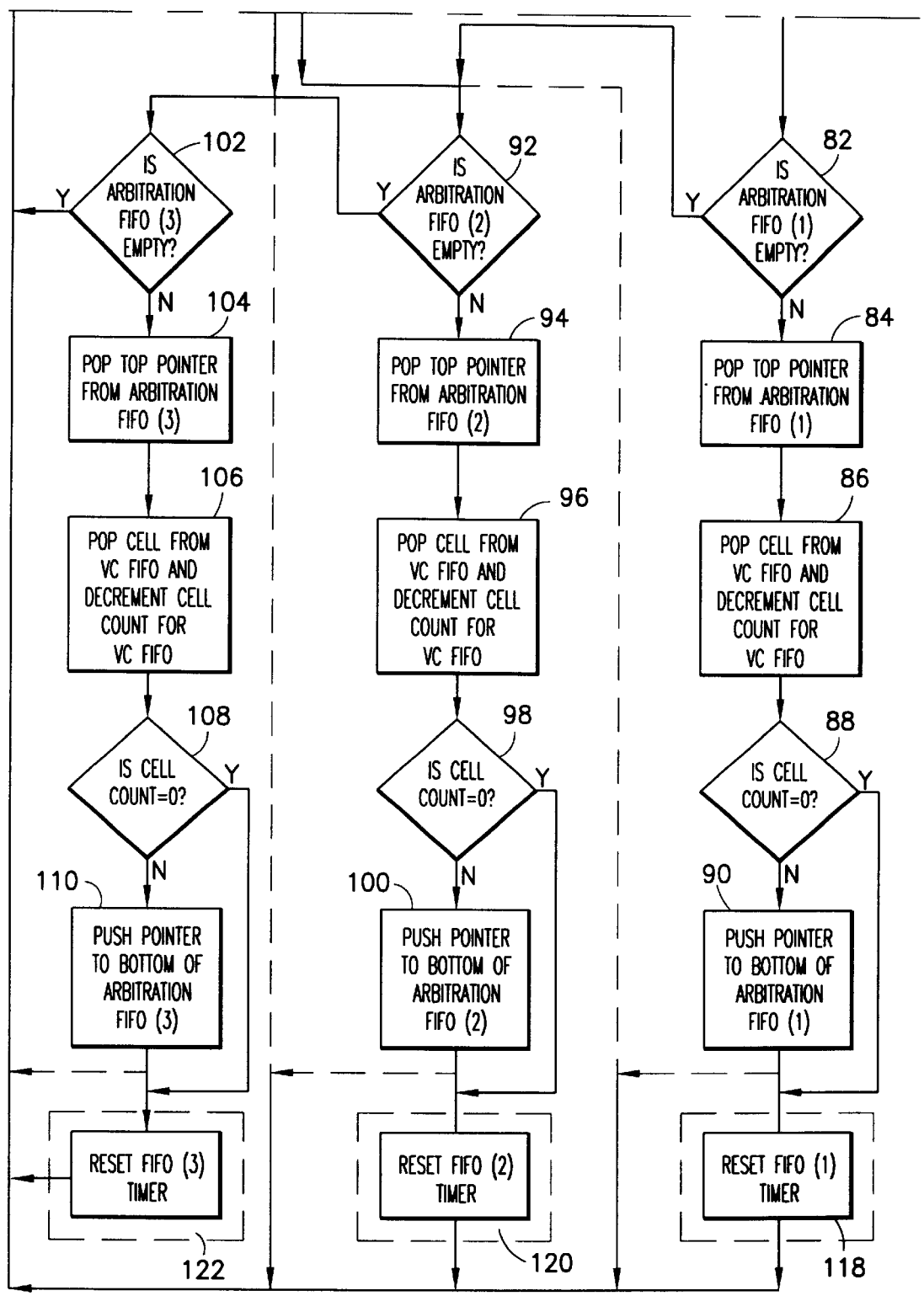
Figure 7:
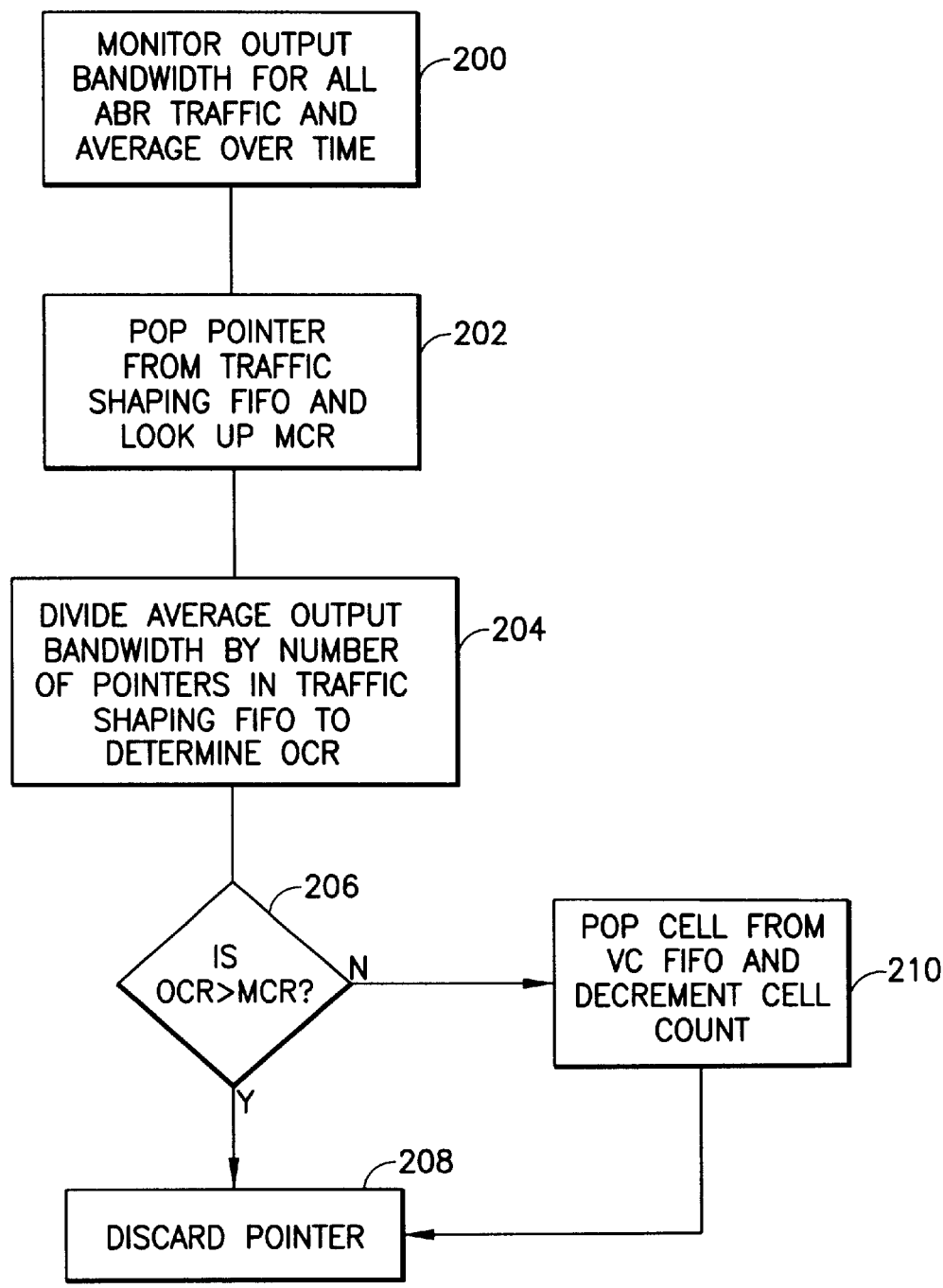
FIG. 7 is a schematic flow chart of how ABR cells exiting the buffering system are handled.

The operation of the buffering system 26 is further illustrated with reference to FIGS. 4–7 where FIGS. 4 and 5 illustrate cells entering the buffer system and FIGS. 6 and 7 illustrate cells exiting the buffer system.

Turning now to FIG. 4, when a cell enters the input cell processor, the header is examined at 50 and the VCI and priority level are determined at 52. If it is determined at 53 that the cell is an ABR cell, leaky bucket processing is performed at 55 (described in more detail below with reference to FIG. 5) and the next cell is then examined at 50. If the cell is not an ABR cell, the cell processor inspects the switch fabric at 54 to determine whether a path is available for the VC. If, at 56, it is determined that no path exists for the VC, the cell is discarded at 58. If a path does exist, the cell processor pushes the cell into VC FIFO(n), where "n" represents the VC, and increments a cell counter for VC FIFO(n) at 60. If it is determined at 62 that the cell count for VC FIFO(n) is "1", i.e. that the FIFO was previously empty, a pointer pointing to VC FIFO(n) is written and pushed at 64 into the appropriate arbitration FIFO depending on the priority level of the cell which was determined at 52. The cell processor then returns to 50 to examine the next cell received from the network. If it is determined at 62 that the VC FIFO was not previously empty, no pointer is written and the cell processor returns to 50 to examine the next cell received from the network. This process is repeated for each cell received by the input cell processor and new VC FIFOs are created as needed for new VCs. Similarly, empty VC FIFOs are released from RAM so that RAM is made available for new VC FIFOs.

Turning now to FIG. 5, and with reference to FIG. 4, if it is determined at 53 that the cell is an ABR cell, the leaky bucket processing begins at 150 as shown in FIG. 5. For each ABR cell received, it is determined at 152 whether the peak cell flow rate for the cell's VC has been exceeded. As described in previously incorporated International Application Number PCT/US96/05606, this determination is based upon a number of operations not illustrated in FIG. 5 herein. In particular, the leaky bucket processor times the arrival of each ABR cell and calculates the time difference between the arrival of cells for each VC. Each time difference is compared to a stored bucket level and bucket increment and the bucket level and bucket increment are adjusted accordingly. A stored maximum bucket level is then subtracted from the adjusted bucket level to provide a current overflow level. If the overflow level is less than or equal to zero, the peak rate has not been exceeded and the processing of the cell continues at 154 in FIG. 5. The cell is pushed into the appropriate VC FIFO and a pointer to the cell is pushed into the traffic shaping buffer at 154. Preferably, prior to pushing the cell into the VC FIFO, the switch fabric is examiner to determine whether a path is available and the cell is discarded if there is no available path. The pointer pushed into the traffic shaping buffer includes the onward transmission time for the cell. If, on the other hand, it is determined at 152 that the peak rate has been exceeded, the overflow value is added to the onward transmission time at 156 before the cell is buffered and the pointer is written at 154. In this case, the pointer will include the sum of the onward transmission time plus the overflow value. The cell is then treated like all other cells so that a pointer is placed in the arbitration buffer at 160 if it is determined at 158 that this is the first cell entering the buffer. The leaky bucket processing of incoming cells then returns at 162 to examine the next cell at 50 in FIG. 4. According to a presently preferred embodiment of the invention, two leaky bucket processors are operated in parallel, one for monitoring peak flow rates and the other for monitoring average flow rates. Overflow values from the two buckets are compared and the greater of the two values is used to increment the time pointer for the ABR cell.

As the above described processes continue, the cell processor outputs cells to the switch fabric from the VC FIFOs according to a selected procedure. FIGS. 6 and 7 show a presently preferred procedure with optional portions shown in phantom lines and phantom line boxes.

Turning now to FIG. 6, the basic output procedure for all cells starts at 70. According to the essential principles of the invention, the arbitration FIFOs are examined to determine whether they contain pointers to VC FIFOs. In a simplified embodiment of the invention, the highest priority FIFO(0) is always examined first at 72. If the FIFO is not empty, the top pointer in the FIFO is popped at 74. At 76, the VC FIFO to which the pointer points is popped and the cell count for the VC FIFO is decremented. If it is determined at 78 that the cell count of the VC FIFO is zero, the procedure returns to the start 70 and examines the arbitration FIFO(0) again at 72. If it is determined at 78 that the cell count of the VC FIFO is not zero, the pointer to the VC FIFO is pushed back into the arbitration FIFO(0) at 80 and the procedure then returns to start 70 and examines the arbitration FIFO(0) again at 72. According to this simplified embodiment of the invention, none of the other arbitration FIFOs are examined until the FIFO(0) is empty as determined at 72. If it is determined at 72 that the arbitration FIFO(0) is empty, the procedure goes to 82 and examines the contents of arbitration FIFO(1). If the arbitration FIFO(1) is determined at 82 to contain pointers, the top pointer is popped at 84, the corresponding VC FIFO is popped at 86, the pointer is pushed back into FIFO(1) at 90 if it is determined at 88 that the VC FIFO is not empty, and the procedure returns to the start at 70. Only if it is determined at 82 that the arbitration FIFO(1) is empty, will the procedure go to 92 to examine the contents of arbitration FIFO(2). If, at 82, it is determined that the arbitration FIFO(1) is empty, the procedure described above is repeated at 92–100 with respect to the arbitration FIFO(2). Only if it is determined at 92 that the arbitration FIFO(2) is empty, will the procedure go to 102 to examine the contents of arbitration FIFO(3) which, as shown in FIG. 6, is the ABR arbitration FIFO. If, at 92, it is determined that the arbitration FIFO(2) is empty, the procedure described above is repeated at 102–110 with respect to the arbitration FIFO(3) with one exception. Prior to popping the ABR cell from the VC FIFO, a determination is made at 105 whether the OCR is greater than the MCR for this particular VC; and the cell is popped only if OCR>MCR. The calculation of OCR is described in more detail below with reference to FIG. 7.

The above simplified embodiment of the invention may be enhanced by setting a timer for each of the three lower level arbitration FIFOs. According to a second embodiment of the invention, after the procedure starts at 70, timers are examined at 112–116 before examining the arbitration FIFO (0). In particular, the timer for arbitration FIFO(1) is examined at 112 and if it has expired the procedure goes to 82 where the arbitration FIFO(1) is examined as described above. In addition, the timer for arbitration FIFO(1) is reset at 118 before the procedure returns to start at 70. If the timer for arbitration FIFO(1) has not expired as determined at 112, the timer for arbitration FIFO(2) is examined at 114 and if it has expired the procedure goes to 92 where the arbitration FIFO(2) is examined as described above. In addition, the timer for arbitration FIFO(2) is reset at 120 before the procedure returns to start at 70. If the timer for arbitration FIFO(2) has not expired as determined at 114, the timer for arbitration FIFO(3) is examined at 116 and if it has expired the procedure goes to 102 where the arbitration FIFO(3) is examined as described above. In addition, the timer for arbitration FIFO(3) is reset at 122 before the procedure returns to start at 70. In this embodiment, the decisions at 82, 92, and 102 may be modified such that upon determining that an arbitration FIFO is empty, the procedure returns to start, rather than to examine the next arbitration FIFO.

In addition to the above, the procedure may be further enhanced by testing whether paths through the switch fabric have broken. For example, after the VC pointer is popped at 74, but before the cell is popped from the VC FIFO into the switch, the cell processor determines at 124 if the switch fabric path for this VC is broken. If it is, the cell processor determines at 126 whether an alternate path is available through the second switch fabric. If an alternative path is available, the cell processor pushes the pointer at 128 into the appropriate arbitration FIFO for the second switch fabric and then returns to start at 70. If the path is broken and no alternative path is available, the cell is discarded at 130. It will be appreciated that this testing of the switch fabric may be implemented for each arbitration FIFO. Therefore, the routines at 82–90, 92–100, and 102–110 would be modified to include the same steps as described with reference to 124–130. Those skilled in the art will appreciate that the pointers stored in the arbitration FIFOs preferably include information for output port number, switch fabric preference, and priority, in addition to the VC information.

According to still another embodiment of the invention, the arbitration of the buffering system can be further enhanced to deal with "blocked ports". According to this embodiment, another arbitration FIFO is created for pointers to VCs having blocked ports. The blocked port arbitration FIFO is then given the highest priority. Since the presence of a single blocked port could, under this system, prevent all cells from being transmitted until a particular port becomes un-blocked, the pointers in the blocked port arbitration FIFO are preferably recycled each time a pointer encounters a blocked port. In other words, when a pointer is popped from a blocked port arbitration FIFO, the pointer is pushed back to the bottom of the FIFO if it points to a VC which continues to have a blocked port. According to a presently preferred implementation, a separate blocked port FIFO is provided for each priority arbitration FIFO so that the blocked ports are also dealt with according to priority level.

In order to assure that the MCR for each ABR VC is maintained, the leaky bucket processing according to the invention monitors the ABR traffic through the switch and makes certain adjustments to the flow of ABR traffic as illustrated in FIG. 7.

Turning now to FIG. 7, the cell processor monitors the output bandwidth for all ABR traffic over time and determines an average value periodically at 200. Each time a pointer is popped from the traffic shaping FIFO at 202, the MCR for the VC corresponding to the pointer is looked up in the look-up table. It will be recalled that pointers are popped from the traffic shaping FIFO according to the time stamp contained in the pointers which were assigned as described herein above with reference to FIG. 5. Upon a pointer being popped from the traffic shaping FIFO, the cell processor divides the current average output bandwidth by the number of pointers remaining in the traffic shaping buffer in order to determine an output cell rate (OCR) per ABR VC. The OCR is compared to the MCR at 206 and if the OCR is greater than the MCR for this particular VC, the pointer is discarded and the forwarding of cells for this VC is left to be accomplished by the arbitration buffer as described above with reference to FIG. 6. If, on the other hand, the OCR is not greater than the MCR, the cell pointed to by the pointer is popped from the VC FIFO and the cell count for the VC FIFO is decremented at 210 before the pointer is discarded at 208.

From the foregoing, it will be appreciated that the output bandwidth available for ABR traffic is allocated fairly among ABR VCs with due consideration being given to the MCR for each VC. In addition, according to the invention, the calculated OCR can be used to provide a new ER which is signalled back to the source for each ABR VC handled by the switch. According to a presently preferred embodiment, the ER is set equal to or slightly below the OCR with a lower threshold being provided so that the FIFO does not empty. In addition, it is preferable to set the ER based on one or more de-rating factors which may be global throughout the network or individual for each port. Moreover, the ER for each VC may be customized based on the number of cells in the FIFO for each VC according to formula (1) given below where VCcount is the number of cells in a particular VC FIFO and MAXcount is a configurable parameter for each particular ABR VC.

$$ER = \left(1 - \frac{VCcount}{MAXcount}\right) \times OCR \quad (1)$$

Utilizing formula (1), the ER will be reduced as the number of cells in the VC FIFO increases.

There have been described and illustrated herein several embodiments of a ATM switch with VC priority buffers and ABR traffic shaping. While particular embodiments of the invention have been described, it is not intended that the invention be limited thereto, as it is intended that the invention be as broad in scope as the art will allow and that the specification be read likewise. Thus, while particular numbers and types of FIFO buffers have been disclosed, it will be appreciated that other numbers and types of FIFOs could be utilized. Also, while particular procedures have been shown for reading the arbitration buffers, it will be recognized that other types of procedures could be used. In addition, while a specific leaky bucket traffic shaping method has been disclosed, other traffic shaping methods may be utilized to adjust the rate of traffic based on the input and output rates as measured. Also, while the ABR traffic shaping has been disclosed in conjunction with a particular priority buffering system, the ABR traffic shaping may be used alone or in conjunction with other buffering schemes. Moreover, while particular configurations have been disclosed in reference to the operations of the input and output cell processors, it will be appreciated that other configurations could be used as well. For example, the management of the arbitration, traffic shaping, and VC FIFOs could be accomplished at either the input cell processor or the output cell processor or by a separate processor and not delegated to the input and/or output cell processors. Furthermore, while the ATM switch has been disclosed as having eight slot controllers and the slot controllers have been shown with eight data links, it will be understood that different numbers of slot controllers and data links can be used.

It will therefore be appreciated by those skilled in the art that yet other modifications could be made to the provided invention without deviating from its spirit and scope as so claimed.

What is claimed is:
1. An ATM network switch, comprising:
a) at least one switch fabric; and
b) a plurality of controllers, each controller having,
an input link and an output link to said switch fabric,
at least one external link to an ATM network,
means for receiving ATM cells from the ATM network,
means for determining the VC of cells received from the ATM network,
a plurality of cell buffer means for separately buffering groups of cells of each VC,
means for determining whether each cell received from the ATM network is an ABR cell,
means for creating a pointer to each ABR cell, said pointer including an onward transmission time,
traffic shaping buffer means for buffering said pointers to said ABR cells,
look-up table means for storing an MCR for each ABR VC,
means for determining available output bandwidth for ABR traffic,
calculating means for calculating an allocated output cell rate for each ABR VC,
means for reading pointers from said traffic shaping buffer means,
means for comparing the MCR associated with a pointer read from said traffic shaping buffer means with said allocated output cell rate, and
means for transmitting cells from each of said cell buffer means to another controller via said switch fabric when the MCR associated with a pointer read from said traffic shaping buffer is greater than said allocated output cell rate.
2. An ATM network switch according to claim 1, wherein:
each controller further includes
means for determining a peak rate for ABR traffic,
means for determining if said peak rate has been exceeded,
means for delaying said onward transmission time when said peak rate has been exceeded.
3. An ATM network switch according to claim 2, wherein:
each controller further includes
means for determining an average rate for ABR traffic,
means for determining if said average rate has been exceeded,
means for delaying said onward transmission time when said average rate has been exceeded.
4. An ATM network switch according to claim 1, wherein:
each controller further includes
means for determining an ER based on said allocated output cell rate.
5. An ATM network switch according to claim 1, wherein:
each controller further includes
means for creating an arbitration pointer to each of said cell buffer means,
arbitration buffer means for buffering said arbitration pointers to said cell buffer means,
means for reading arbitration pointers from said arbitration buffer means, and
means for transmitting cells from each of said cell buffer means to another controller via said switch fabric according to arbitration pointers read from said arbitration buffer means.
6. An ATM network switch according to claim 5, wherein:
each controllers further includes means for determining a priority level for each VC,
said arbitration buffer means comprises a separate arbitration buffer for each priority level, and
said means for reading arbitration pointers includes means for ordering the reading of said separate arbitration buffers.
7. An ATM network switch according to claim 6, wherein:
said arbitration buffer means includes an ABR arbitration buffer for ABR arbitration pointers,
said means for reading arbitration pointers includes means for reading ABR arbitration pointers, means for comparing the MCR associated with an ABR arbitration pointer with said allocated output cell rate, and means for transmitting cells from a cell buffer means pointed to by said ABR arbitration pointer to another controller via said switch fabric when the MCR associated with a pointer read from said traffic shaping buffer is less than said allocated output cell rate.

8. A method of controlling ABR traffic in an ATM network switch, comprising:

a) determining the VC for each ABR cell;

b) storing each ABR cell in a respective VC buffer for each ABR VC;

c) determining the MCR for each ABR VC;

d) storing the MCR for each ABR VC in a look-up table;

e) creating a pointer to each ABR cell, the pointer including an onward transmission time;

f) storing the pointers in a pointer buffer;

g) determining available output bandwidth for ABR traffic;

h) calculating an allocated output cell rate for each ABR VC, i) reading pointers from the pointer buffer in order of onward transmission time;

j) comparing the MCR associated with a pointer with the allocated output cell rate; and k) transmitting the cell associated with the pointer when the MCR associated with the pointer is greater than the allocated output cell rate.

9. A method according to claim 8, further comprising:

l) determining a peak rate for ABR traffic;

m) determining if the peak rate has been exceeded;

n) delaying the onward transmission time when the peak rate has been exceeded.

10. A method according to claim 9, further comprising:

o) determining an average rate for ABR traffic;

p) determining if the average rate has been exceeded;

q) delaying the onward transmission time when the average rate has been exceeded.

11. A method according to claim 8, further comprising:

1) determining an ER for each ABR VC based on the allocated output cell rate.

12. A method according to claim 11, further comprising:

m) adjusting the ER for each ABR VC based on the number of cells in a respective ABR VC buffer.

13. An ATM network switch, comprising:

a) at least one switch fabric; and b) a plurality of controllers, each controller having, an input link and an output link to said switch fabric, at least one external link to an ATM network, means for receiving ATM cells from the ATM network, means for determining whether each cell received from the ATM network is an ABR cell, means for determining the MCR for each ABR VC, means for determining available output bandwidth for ABR traffic, buffer means for buffering ABR cells, means for comparing the MCR associated with a pointer read from said traffic shaping buffer means with said allocated output cell rate, and means for transmitting ABR cells from said buffer means to another controller via said switch fabric based on a comparison of MCR and available output bandwidth for ABR traffic.

14. An ATM network switch according to claim 13, wherein:

each controller further includes means for determining a peak rate for ABR traffic, means for determining if said peak rate has been exceeded, means for delaying transmission of ABR cells when said peak rate has been exceeded.

15. An ATM network switch according to claim 14, wherein:

each controller further includes means for determining an average rate for ABR traffic, means for determining if said average rate has been exceeded, means for delaying transmission of ABR cells when said average rate has been exceeded.

16. An ATM network switch according to claim 13, wherein:

each controller further includes means for determining an ER based on said available output bandwidth for ABR traffic.

17. An ATM network switch according to claim 16, wherein:

each controller further includes means for determining the number of ABR cells in said buffer means, and means for adjusting said ER based on the number of ABR cells in said buffer means.

18. A method of controlling the flow of cells on an ABR connection at a buffering point in an ATM network switch, comprising using a traffic shaping process to guarantee a minimum cell rate (MCR) for the ABR VC said traffic shaping process including determining the MCR for each ABR VC, determining the output bandwidth for ABR traffic, comparing each MCR associated with a pointer to the allocated output cell rate, and using the result of the comparison to control the transmission of ABR cells.

19. A method according to claim 18, which also comprises using an arbitration process to ensure a fair distribution of bandwidth through all the VCs on the switch.

20. A method according to claim 18, wherein the traffic shaping process comprises a leaky bucket process comprising:

timing the arrival of each cell on the ABR;

storing a predetermined regular bucket increment, a current bucket level value, a bucket maximum value, being the maximum capacity of the bucket, and an onward transmission time for the previous cell on the same VC;

calculating the time difference between the arrival time of the cell and the stored onward transmission time for the preceding cell on the same VC;

calculating a new bucket level from the time difference, the current bucket level, and the bucket increment;

subtracting the maximum level from the new level to give an over flow value and, if the overflow value is negative, setting the value of the overflow to zero; and adding the overflow value to the current time to give the onward transmission time for the cell.

21. A method according to claim 19, comprising for each ABR cell arriving at the buffering point:

(a) storing the cell in a buffer for that particular VC and storing in an arbitration FIFO a pointer to the cell address;

(b) monitoring the input cell rate on the ABR connection;

(c) determining from the input rate the onward transmission time for the cell and storing in a traffic shaping FIFO at an address corresponding to the onward transmission time a pointer to the cell address;

(d) monitoring the onward cell rate for the ABR connection and determining an average;

(e) when the next cell transmission pointer emerges from the traffic shaping FIFO, obtaining from storage means the MCR for that VC and comparing the MCR with the average onward cell rate (OCR) determined in step (d) and, only if the OCR<MCR, outputting the cell to which the pointer refers; and (f) when the next cell transmission pointer for that VC emerges from the arbitration FIFO, obtaining from said storage means the MCR for that VC and comparing the MCR with the OCR determined in step (d) and, if OCR>MCR, outputting the cell to which the pointer refers, and then reintroducing the pointer into the bottom of the arbitration FIFO.

22. An ATM network switch comprising cell buffering means, the buffering means comprising traffic shaping means for guaranteeing a minimum cell rate for each ABR VC configured on the switch said traffic shaping means comprising means for determining the MCR for each ABR VC, means for determining the output bandwidth for ABR traffic, means for comparing each MCR associated with a pointer to the allocated output cell rate, and means for using the result of the comparison to control the transmission of ABR cells.

23. A switch according to claim 22, also comprising arbitration means for ensuring a fair distribution of bandwidth through all the VCs on the switch.

24. A switch according to claim 23, comprising:

a separate FIFO for each VC configured through the switch; and control means arranged to store each incoming cell in the appropriate FIFO;

wherein the arbitration means is arranged to determine which of the FIFOs is to send the next cell to be transmitted onward from the buffering means, and the traffic shaping means is arranged to regulate the onward transmission time of ABR cells according to the rate of output of the ABR cells from the buffering means.

25. A switch according to any of claim 22, wherein the traffic shaping means comprises at least one leaky bucket processor, the or each leaky bucket processor comprising:

timer means for timing the arrival of each ATM cell at the buffering means;

memory means for storing a predetermined regular bucket increment, a current bucket level value, a bucket maximum value, being the maximum capacity of the bucket, and an onward transmission time for the previous cell on the same VC;

calculating means for calculating the time difference between the arrival time of the cell and the stored onward transmission time for the preceding cell on the same VC, and for calculating a new bucket level from the time difference, the current bucket level and the bucket increment;

means for subtracting the maximum level from the new level to give an overflow value and, if the overflow value is negative, for setting the value of the overflow to zero; and adding means for adding the overflow value to the current time to give the onward transmission time for the cell and for storing said time in the memory means.

* * * * *